(12) United States Patent
Kirkpatrick

(10) Patent No.: US 10,131,206 B1
(45) Date of Patent: Nov. 20, 2018

(54) AIR DELIVERY SYSTEMS AND METHODS FOR A VEHICLE PASSENGER COMPARTMENT

(71) Applicant: Michael W. Kirkpatrick, Buckeye, AZ (US)

(72) Inventor: Michael W. Kirkpatrick, Buckeye, AZ (US)

( * ) Notice: Subject to any disclaimer, the term of this patent is extended or adjusted under 35 U.S.C. 154(b) by 597 days.

(21) Appl. No.: 14/633,760

(22) Filed: Feb. 27, 2015

(51) Int. Cl.
*B60H 1/00* (2006.01)
*B60H 1/26* (2006.01)
*B60R 21/13* (2006.01)

(52) U.S. Cl.
CPC ............. *B60H 1/26* (2013.01); *B60R 21/13* (2013.01)

(58) Field of Classification Search
CPC ................................. B60R 21/13; A42B 3/286
See application file for complete search history.

(56) References Cited

U.S. PATENT DOCUMENTS

| | | | |
|---|---|---|---|
| 3,526,428 A | 9/1970 | Porsche et al. | |
| 3,688,314 A | 9/1972 | Hill | |
| 3,736,927 A | 6/1973 | Misaqi | |
| 5,146,757 A | 9/1992 | Dearing | |
| 5,921,467 A | 7/1999 | Larson | |
| 6,588,833 B2 * | 7/2003 | Strommer | B60H 1/00464 296/214 |
| 6,884,159 B1 | 4/2005 | Ferraud, Jr. | |
| 6,973,676 B1 | 12/2005 | Simpson | |
| 7,083,514 B1 | 8/2006 | Stamey, Jr. et al. | |
| 8,336,113 B2 | 12/2012 | Uttrachi | |
| 8,684,800 B2 | 4/2014 | Baldal | |
| 2012/0246809 A1 | 10/2012 | Elam et al. | |
| 2013/0069399 A1 * | 3/2013 | Ishida | B60N 2/5635 297/180.13 |
| 2013/0319785 A1 * | 12/2013 | Spindler | B62D 23/005 180/292 |

FOREIGN PATENT DOCUMENTS

GB    1275023 A  *  5/1972  .........  B60H 1/00371

* cited by examiner

*Primary Examiner* — Gregory Huson
*Assistant Examiner* — Elizabeth M May
(74) *Attorney, Agent, or Firm* — Michael W. Goltry; Robert A. Parsons; Parsons & Goltry

(57) ABSTRACT

A vehicle includes a body mounted with a chassis, the body having a passenger compartment, a seat in the passenger compartment for supporting an occupant in a sitting position, and a roll over protection structure for the passenger compartment. The roll over protection structure includes an inlet coupled in gaseous communication to an air source, an outlet coupled in gaseous communication to a vehicle occupant wearable, and an airflow pathway through the roll over protection structure coupling the inlet to the outlet in gaseous communication.

5 Claims, 7 Drawing Sheets

AIR DELIVERY SYSTEMS AND METHODS FOR A VEHICLE PASSENGER COMPARTMENT

FIELD OF THE INVENTION

The present invention relates to air delivery systems of vehicle passenger compartments, and, more particularly, to an air delivery system for delivering air to wearables, such as helmets, worn by vehicle occupants.

BACKGROUND OF THE INVENTION

An all-terrain vehicle (ATV) is a vehicle that travels on low-pressure tires, with a seat that is straddled by the operator, along with handlebars for steering control. ATVs are intended for use by a single operator, although tandem ATVs can be used by an operator and one passenger. The first three-wheeler ATV was developed in 1967, and remained popular until the late 1980's. The first four-wheeler ATV was developed in the early 1980's, and remain popular today.

Four-wheel ATVs incorporate a body mounted to a wheeled chassis. The body has a passenger compartment with at least two seats, one for accommodating the driver in a sitting position, and another for accommodating a passenger in a sitting position, and a roll over protection structure for protecting the occupants in the passenger compartment from being injured in an accident, particularly in the event of a roll-over. Some four-wheel ATVs have four seats, one driver's seat and three passenger seats. The roll over protection structure, a roll cage, an engineered and constructed frame built to the occupants in the passenger compartment, also tend to stiffen the chassis, which is desirable in racing applications.

Other than the protection offered by the roll over protection structure, the passenger compartments of four-wheel ATVs are open. During use, the occupants breath the outside air rushing through the passenger compartment, which air often carries dust, sand, and other airborne particulates that, when inhaled, can not only be unhealthy, but also result in coughing and sneezing. Accordingly, there is a need in the art for an air delivery system for delivering air to vehicle passenger compartment occupants for breathing, not only in the field of vehicles having roll over protection structures, such as roll cages, for passenger compartments, but also in the field of vehicles having open passenger compartments.

SUMMARY OF THE INVENTION

In an illustrative embodiment of the invention, a roll over protection structure for a vehicle passenger compartment includes an inlet coupled in gaseous communication to an air source, an outlet coupled in gaseous communication to a wearable, and an airflow pathway through the roll over protection structure coupling the inlet to the outlet in gaseous communication. The roll over protection structure is formed of structural tubing defining the airflow pathway. The structural tubing forms at least a part of a roll cage comprising the roll over protection structure. The inlet is coupled in gaseous communication to the air source with a conduit. The air source is an air pump. The outlet is coupled in gaseous communication to the wearable with a conduit. The wearable is a helmet.

In another illustrative embodiment of the invention, a vehicle includes a body mounted with a chassis. The body has a passenger compartment, a seat in the passenger compartment for supporting an occupant in a sitting position, and the seat includes an upright seat back. The body includes an inlet coupled in gaseous communication to an air source, an outlet coupled in gaseous communication to a vehicle occupant wearable, and an airflow pathway through the body coupling the inlet to the outlet in gaseous communication. The outlet is located near the upright seat back. The inlet is coupled in gaseous communication to the air source with a conduit. The air source is an air pump. The outlet is coupled in gaseous communication to the vehicle occupant wearable with a conduit. The vehicle occupant wearable is a helmet.

In yet another illustrative embodiment of the invention, a vehicle includes a body mounted with a chassis. The body having a passenger compartment, a seat in the passenger compartment for supporting an occupant in a sitting position, and a roll over protection structure for the passenger compartment. The roll over protection structure includes an inlet coupled in gaseous communication to an air source, an outlet coupled in gaseous communication to a vehicle occupant wearable, and an airflow pathway through the roll over protection structure coupling the inlet to the outlet in gaseous communication. The roll over protection structure is formed of structural tubing defining the airflow pathway. The structural tubing forms at least a part of a roll cage comprising the roll over protection structure. The inlet is coupled in gaseous communication to the air source with a conduit. The air source is an air pump. The outlet is coupled in gaseous communication to the vehicle occupant wearable with a conduit. The vehicle occupant wearable is a helmet. The seat includes an upright seat back having a top, and the outlet is located near the top of the upright seat back.

In still another illustrative embodiment of the invention, a method includes providing a roll over protection structure for a vehicle passenger compartment, the roll over protection structure having an inlet, an outlet, and an airflow pathway through the roll over protection structure coupling the inlet to the outlet in gaseous communication, coupling the inlet in gaseous communication to an air source, and coupling the outlet in gaseous communication to a wearable. The step of coupling the inlet in gaseous communication to the air source further includes coupling the inlet in gaseous communication to an air pump. The step of coupling the inlet in gaseous communication to the air pump further includes providing a conduit having a first end and a second end, coupling the first end of the conduit in gaseous communication to the air pump, and coupling the second end of the conduit in gaseous communication to the inlet. The step of coupling the outlet in gaseous communication to the wearable further includes coupling the outlet in gaseous communication to a helmet. The step of coupling the outlet in gaseous communication to the helmet further includes providing a conduit having a first end and a second end, coupling the first end of the conduit in gaseous communication to the outlet, and coupling the second end of the conduit in gaseous communication to the helmet.

In yet still another illustrative embodiment of the invention, a method includes providing a vehicle including a body mounted with a chassis, the body having a passenger compartment, a seat, including an upright seat back, in the passenger compartment for supporting an occupant in a sitting position, an inlet, an outlet located near the upright seat back, and an airflow pathway through the body coupling the inlet to the outlet in gaseous communication, coupling the inlet in gaseous communication to an air source, and coupling the outlet in gaseous communication to a wearable. The step of coupling the inlet in gaseous communication to the air source further includes coupling the inlet in gaseous communication to an air pump. The step of coupling the inlet in gaseous communication to the air pump further includes providing a conduit having a first end and a second end, coupling the first end of the conduit in gaseous communication to the air pump, and coupling the second end of the conduit in gaseous communication to the inlet. The step of coupling the outlet in gaseous communication to the wearable further includes coupling the outlet in gaseous communication to a helmet. The step of coupling the outlet in gaseous communication to the helmet further includes providing a conduit having a first end and a second end, coupling the first end of the conduit in gaseous communication to the outlet, and coupling the second end of the conduit in gaseous communication to the helmet.

In still a further illustrative embodiment of the invention, a method includes providing a vehicle including a body mounted with a chassis, the body having a passenger compartment, a seat in the passenger compartment for supporting an occupant in a sitting position, and a roll over protection structure for the passenger compartment, the roll over protection structure including an inlet, an outlet, and an airflow pathway through the roll over protection structure coupling the inlet to the outlet in gaseous communication, coupling the inlet in gaseous communication to an air source, and coupling the outlet in gaseous communication to a wearable. The step of coupling the inlet in gaseous communication to the air source further includes coupling the inlet in gaseous communication to an air pump. The step of coupling the inlet in gaseous communication to the air pump further includes providing a conduit having a first end and a second end, coupling the first end of the conduit in gaseous communication to the air pump, and coupling the second end of the conduit in gaseous communication to the inlet. The step of coupling the outlet in gaseous communication to the wearable further includes coupling the outlet in gaseous communication to a helmet. The step of coupling the outlet in gaseous communication to the helmet further includes providing a conduit having a first end and a second end, coupling the first end of the conduit in gaseous communication to the outlet, and coupling the second end of the conduit in gaseous communication to the helmet.

BRIEF DESCRIPTION OF THE DRAWINGS

Referring to the drawings.

DETAILED DESCRIPTION

Figure 1:
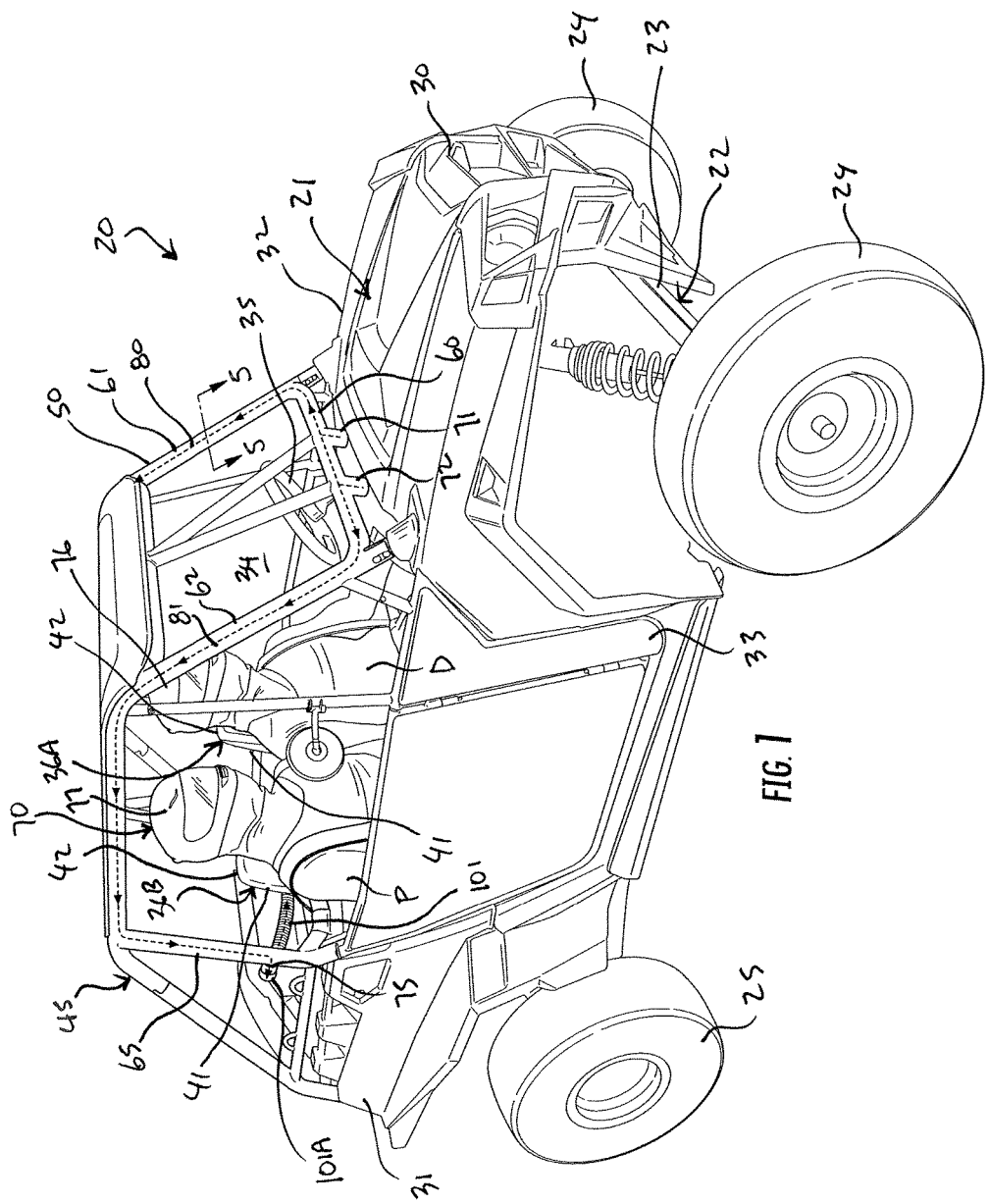
FIG. 1 is a front, right side perspective view of a vehicle including a vehicle body mounted with a chassis, the vehicle body includes a passenger compartment, a roll over protection structure for the passenger compartment, seats in the passenger compartment each for supporting an occupant in a sitting position, and an air delivery system for delivering air to helmets shown being worn by occupants seated in the respective seats.
Figure 2:
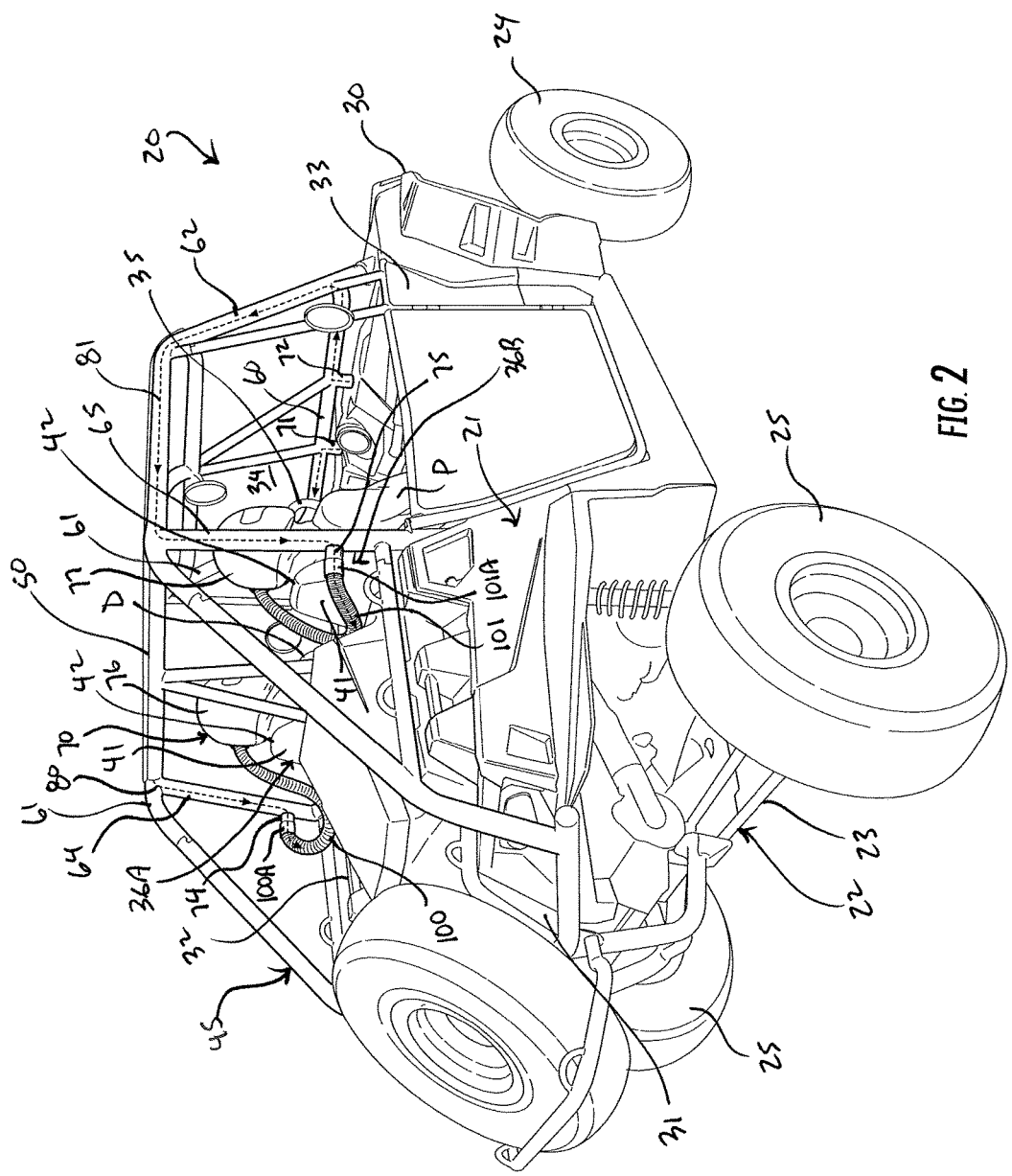
FIG. 2 is a rear, right side perspective view of the embodiment of FIG. 1.

Referring to the drawings, in which like reference characters indicate corresponding elements throughout the several views, attention is first directed to FIGS. 1 and 2 in which there is seen a vehicle 20 including a body 21 mounted with a chassis 22. Chassis 22 includes a frame 23 supported above ground level by two front wheels 24 and two rear wheels 25. Front wheels 24 are steerable and provide directional control for vehicle 20. Rear wheels 25 are caused to rotate in response to a conventional engine, transmission and drive train for propulsion of vehicle 20. Chassis 22 is frame 23, wheels 24 and 25, and the machinery of vehicle 20, on which body 21 is supported.

Body 21 on chassis 22 has a forward end 30, a rearward end 31, a left or street side 32, a right or curb side 33, and a vehicle passenger compartment 34. Passenger compartment 34 is between front wheels 24 and rear wheels 25 at the middle of body 21 between forward and rearward ends 30 and 31 and between left and right sides 32 and 33. In passenger compartment 34 are the conventional controls associated with the manipulation of chassis 11, such as steering wheel 35 for steering front wheels 24, throttle and brake pedals, etc. Body 21 has two seats 36 in passenger compartment 34, positioned side-by-side in this example, including seat 36A behind steering wheel 35 adjacent to left side 32 of body 21 for accommodating driver D in a sitting position, and seat 36B beside seat 36A adjacent to right side 33 of body 21 for accommodating a passenger P in a sitting position. Seat 36A adjacent to left side 32 of body 21 is a left seat of vehicle 20, and seat 36B adjacent to right side 33 of body 21 is a right seat of vehicle 20. Left seat 36A includes seat portion 40 in FIG. 3 and a seat back 41 in FIGS. 1 and 2 that extends upright from seat portion 40 in FIG. 3 to an upper end or top 42 in FIGS. 1 and 2. Identically, right seat 36B includes seat portion 40 in FIG. 4 and a seat back 41 in FIGS. 1, 2, and 4 that extends upright from seat portion 40 in FIG. 4 to an upper end or top 42 in FIGS. 1, 2, and 4.

Vehicle 20 includes a roll over protection structure 45 for passenger compartment 34 for protecting occupants in passenger compartment 34 from being injured in an accident, particularly in the event of a roll-over. Roll over protection structure 45 is a roll cage 50. Roll cage 50, conventionally connected to body 21 and chassis 22, is a specially engineered and constructed frame, an openwork being of a lattice-like nature showing openings between its structure, built around passenger compartment 34 of vehicle 20 to protect its occupants, driver D and passenger P, from being injured in an accident, particularly in the event of a roll-over, and which helps to stiffen chassis 22. Roll cage 50 is considered a part of or otherwise an extension of body 21 and chassis 22, and is a preferred embodiment of roll over protection structure 45 intended to protect passenger compartment 34 occupants, in this case driver D and passenger P seated in left and right seats 36A and 36B, respectively, from damage and injuries caused by vehicle 20 overturns or rollovers.

Roll cage 50 can have many different designs and configurations depending on the application. In this example, roll cage 50 is constructed of hollow structural tubing of metal, such as steel, aluminum, or other material or combination of materials have strong, rigid, and resilient material characteristics as is customary with vehicle roll cages. The structural tubing of roll cage 50 forming a preferred embodiment of roll over protection structure 45 includes structural tubes, some being bent to shape and some being straight, which are rigidly connected together with welding and connecting joints, which, again, is customary with vehicle roll cages.

Figure 3:
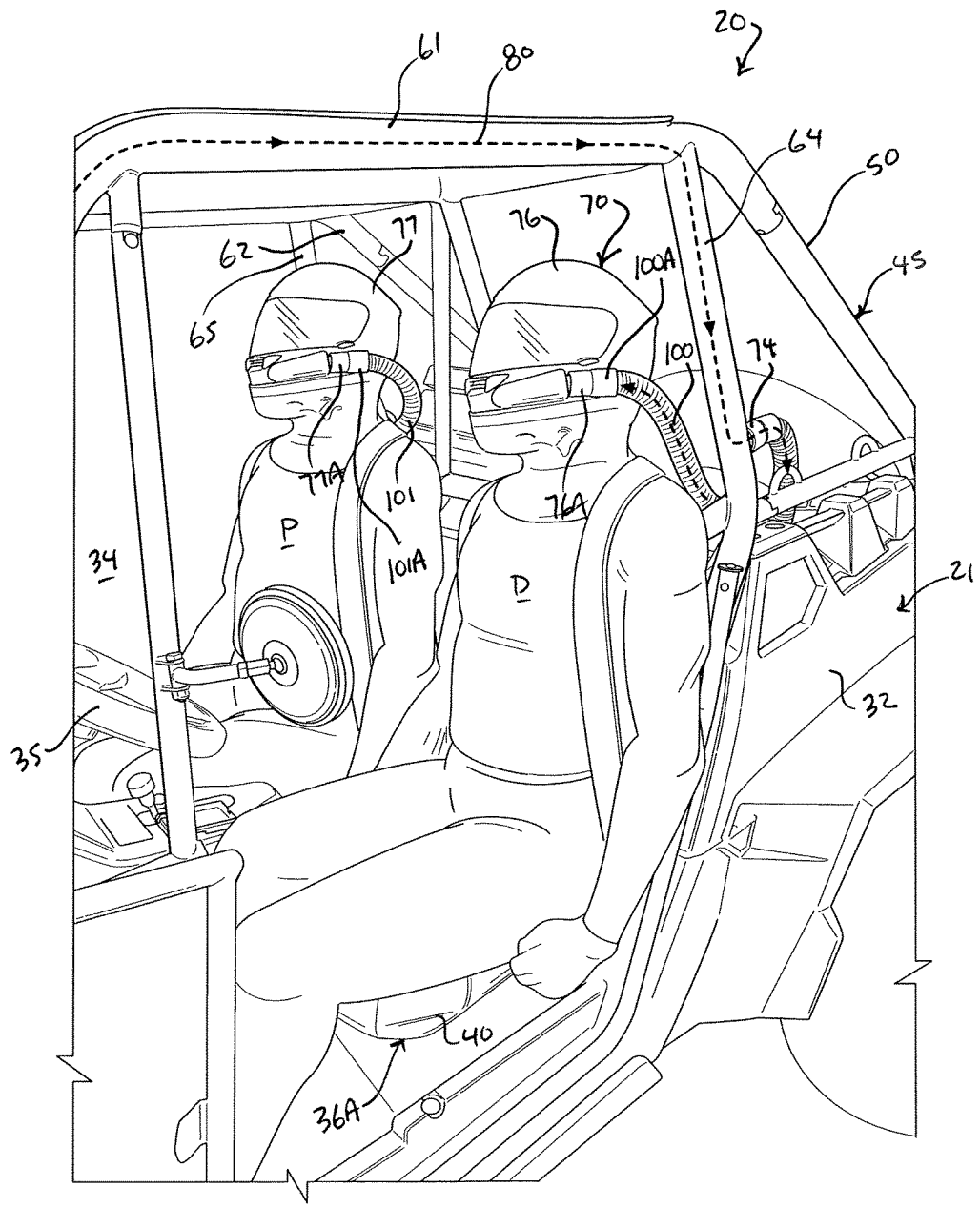
FIG. 3 is an enlarged, fragmented, left side perspective view of the embodiment of FIG. 1 with portions of the vehicle body being removed to better illustrate the occupants seated in the respective seats, the helmets worn by the respective occupants, and helmet conduits coupled to deliver air to the respective helmets.
Figure 4:
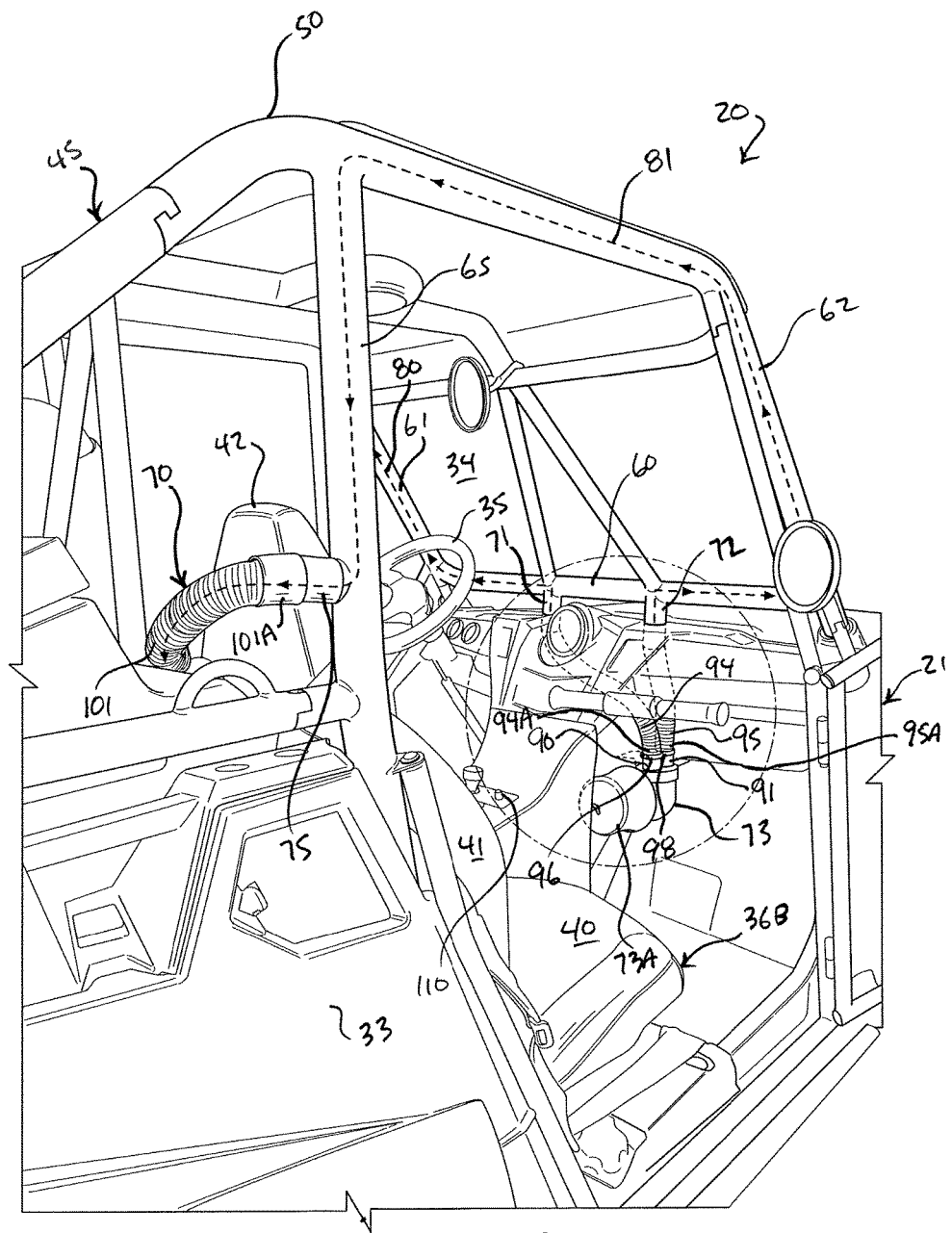
FIG. 4 is an enlarged, fragmented, right side perspective view of the embodiment of FIG. 1, with portions of the vehicle body being removed to illustrate an air pump coupled in gaseous communication to the roll over protection structure.

Roll cage 50 extends upwardly and over passenger compartment 34 from the front of passenger compartment 34 to the back of passenger compartment 34 and from left side 32 of body 21 to right side 33 of body 21. In this example, the structural tubing of roll cage 50 includes a latticework or structural tubes. Among the various structural tubes of roll cage 50 are a horizontal leading structural tube 60 at the front of passenger compartment 34 ahead of steering wheel 35. Leading structural tube 60 extends transversely across body 21 from left side 32 of body 21 to right side 35 of body 21, and is perpendicular to the longitudinal, central axis of vehicle 20 extending from forward end 30 to rearward end 31 of body 21. Leading structural tube 60 extends to a left or street side structural tube 61 at left side 32 of body 21, and to a right or curb side structural tube 62 at right side 33 of body 21. Left side structural tube 61 extends along the left or street side of passenger compartment 34 at the left or street side 32 of body 21. Right side structural tube 62 extends along the right or street side of passenger compartment 34 at the right or curb side 33 of body 21. Left side structural tube 61 extends upright at the front of passenger compartment 34 in FIG. 1, extends horizontal over the left or street side of passenger compartment 34 from the front of passenger compartment 34 toward the back of passenger compartment 34, and extends downwardly along the back of passenger compartment 34 in FIGS. 2 and 3 to rearward end 31 of body 21 in FIG. 2. In FIGS. 1 and 2, right side structural tube 62 extends upright at the front of passenger compartment 34, extends horizontal over the right or curb side of passenger compartment 34 from the front of passenger compartment 34 toward the back of passenger compartment 34, and extends downwardly along the back of passenger compartment 34 to rearward end 31 of body 21. Left and right side structural tubes 61 and 62 are axially aligned, and are transverse relative to leading structural tube 60. In FIG. 3, a left stay structural tube 64 extends downward from left side structural tube 61 behind seat back 41 of left seat 36A in FIG. 2. In FIGS. 1, 2, and 4, a right stay structural tube 65 extends downward from right side structural tube 62 behind seat back 41 of right seat 36B.

Vehicle 20, including body 21, chassis 22, and roll cage 50 being a preferred embodiment of roll over structure 45, is generally representative of a four-wheel all-terrain vehicle (ATV). Other than roll cage 50 for passenger compartment 34, passenger compartment 34 is open to the atmosphere owing to the openwork nature of roll cage 50. As a result, during use of vehicle 20 the occupants breath the outside air rushing into the passenger compartment 34 through roll cage 50, which air often carries dust, sand, and other airborne particulates that, when inhaled, not only can be unhealthy, but also can result in coughing and sneezing. To provide breathing air to the occupants of vehicle 20, driver D and passenger P in FIGS. 1-3, vehicle 20 incorporates an air delivery system 70 for delivering air to the vehicle 20 passenger compartment 34 occupants for breathing.

Referring in relevant part to FIGS. 1-8, system 70 includes inlets 71 and 72 formed in roll over protection structure 45 each coupled in gaseous communication to an electric air blower or pump 73, outlets 74 and 75 formed in roll over protection structure 45 coupled in gaseous communication to helmets 76 and 77, respectively, an airflow pathway 80 through roll over protection structure 45 coupling inlet 71 to outlet 74 in gaseous communication, and an airflow pathway 81 through roll over protection structure 45 coupling inlet 72 to outlet 75 in gaseous communication. Structural tubing that forms at least a part of roll cage 45 defines airflow pathway 80 and airflow pathway 81. And so inlets 71 and 72 are formed in roll cage 50, outlets 74 and 75 are formed in roll cage 50, airflow pathway 80 extends through roll cage 50 from inlet 71 to outlet 74 and couples inlet 71 to outlet 74 in gaseous communication, and an airflow pathway 81 extends through roll cage 50 from inlet 72 to outlet 75 and couples inlet 72 to outlet 75 in gaseous communication.

In FIGS. 1-3, helmets 76 and 77, each being a form of a wearable, are protective head coverings. Helmet 76 is shown as it would be worn by driver D, and helmet 77, is shown as it would be worn by passenger P. Helmets 76 and 77 are identical, and are each a "full-faced" helmet, i.e., it has a lower forward portion integrally foamed therewith that wraps around the lower front of the face of the wearer, with a forward opening, equipped with a transparent face shield, for vision. Helmets 76 and 77 each preferably meet the standards of at least one governing safety body, e.g., U.S. federal Department of Transportation (DOT), Snell Foundation, etc., although such approval is not required for the function of helmets 76 and 77 in system 70. Helmets 76 and 77 each have a flexible, resilient skirt that forms a neck seal about the neck of the wearer. In FIG. 3, helmet 76 includes inlet 76A for conducting air into the interior of helmet 76 for breathing by the wearer, driver D, and helmet 77 includes inlet 77A for identically conducting air into the interior of helmet 77 for breathing by the wearer, passenger P.

Figure 5:
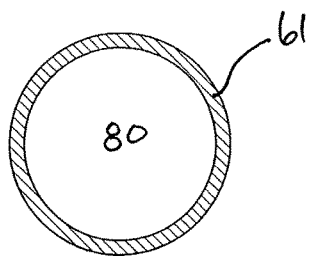
FIG. 5 is a section view taken along line 5-5 of FIG. 1.

As disclosed above, roll cage 50 is constructed of hollow structural tubing/tubes. The hollow characteristic of the structure tubes that form roll cage 50 defines airflow pathway 80 through roll cage 50 from inlet 71 to outlet 74, and airflow pathway 81 from inlet 72 to outlet 75. To illustrate the hollow characteristic of the hollow structure tubes that form roll cage 50, the preferred embodiment of roll over protection structure 45, FIG. 5 is a section view across left side structural tube 61 taken along line 5-5 of FIG. 1 illustrating airflow pathway 80 therein. In the various figures, airflow pathway 80 through structural tubes of roll cage 50 from inlet 71 to outlet 74 is indicated by dashed arrowed lines, and airflow pathway 81 through structural tubes of roll cage 50 from inlet 72 to outlet 75 is likewise indicated by dashed arrowed lines. Along these dashed arrowed lines denoting airflow pathways 80 and 81, the structural tubes are hollow as shown in FIG. 5 with left side structure tube 61.

In FIGS. 1 and 3, airflow pathway 80 extends through inlet 71 and into leading structural tube 60, and extends through leading structural tube 80 toward left side 32 of body 21 to left side structural tube 61. Airflow pathway 80 passes through left side structural tube 61 from leading structural tube 60 to left stay structural tube 64, and passes downwardly through left stay structural tube 64 to outlet 74. In FIGS. 1, 2, and 4, airflow pathway 81 extends through inlet 72 and into leading structural tube 60, and extends through leading structural tube 80 toward right side 33 of body 21 to right side structural tube 62. Airflow pathway 81 passes through right side structural tube 62 from leading structural tube 60 to right stay structural tube 65, and passes downwardly through right stay structural tube 65 to outlet 75.

In FIGS. 1, 2, 4, and 6, inlets 71 and 72 are formed in leading structural tube 60 and are extensions of leading structural tube 60. Inlets 71 and 72 are hollow structural tube fittings formed in leading structural tube 60, and are formed of the same material as that of roll cage 50. Inlet 71 is formed to the left of the center of leading structural tube 60, and inlet 72 is formed to the right of the center of leading structural tube 60. Inlets 71 and 72 are axially aligned and extend downwardly from leading structural tube 60 into body 21. Referring in relevant part to FIGS. 1-4 and 8, outlet 74 is formed in left stay structural tube 64 adjacent to the outer side of left seat 36A near left side 32 of body 21 behind and near top 42 of seat back 41 of left seat 36A, and extends rearwardly from left stay structural tube 64. Outlet 75 is formed in right stay structural tube 36B adjacent to the outer side of right seat 36B near right side 33 of body 21 behind and near top 42 of seat back 41 of right seat 36B, and extends rearwardly from right stay structural tube 65. Outlet 74 is an extension of left stay structural tube 64, and outlet 75 is an extension of right stay structural tube 65. Outlets 74 and 75 are hollow structural tube fittings formed in left and right side structural tubes 64 and 65, respectively, and are formed of the same material as that of roll cage 50. Outlets 74 and 75 are axially aligned.

Figure 6:
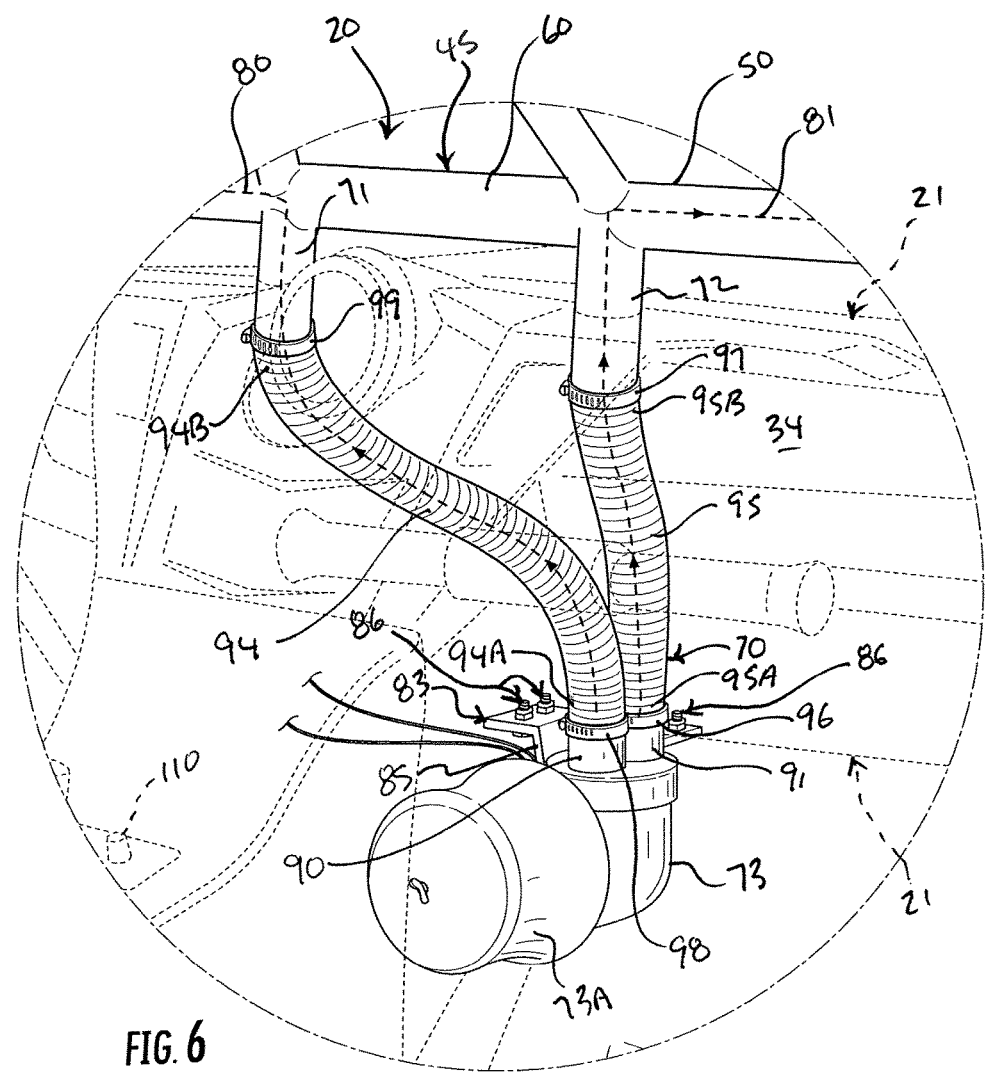
FIG. 6 is an enlarged perspective view corresponding to FIG. 4 illustrating air pump conduits coupling the air pump in gaseous communication to respective inlets of the roll cage.
Figure 7:
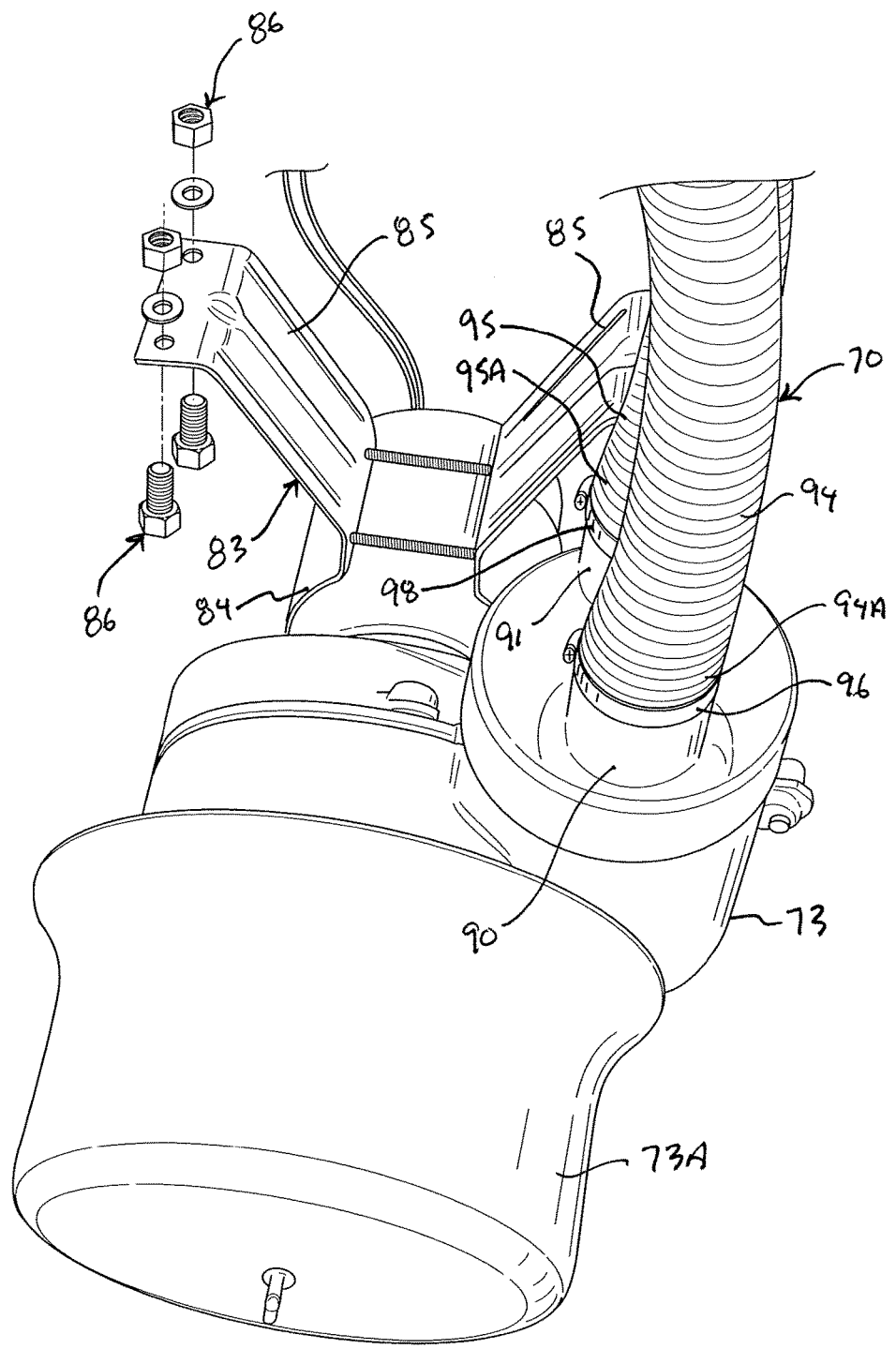
FIG. 7 is an enlarged perspective view of the air pump corresponding to FIGS. 4 and 6 illustrating a bracket attached to the air pump, and exploded nut-and-bolt assemblies shown as they would appear in preparation for releasably connecting the bracket to the vehicle body.

Air pump 73 is the air source of system 70. In FIGS. 4, 6, and 7, air pump 73 is an electric air blower or pump 73 mounted to body 21 in passenger compartment 34 toward the front thereof underneath inlets 71 and 72 with a connecting bracket 83. In FIG. 7, connecting bracket 83 has a clamp end 84 clamped to air pump 73. Connecting arms 85 diverge upwardly from clamp end 84 and are releasably connected to body 21 in passenger compartment 34 with fasteners 86, which are nut-and-bolt assemblies 86 in this example. Air pump 73 is entirely conventional, and is equipped with an air filter 73A and two outlets 90 and 91. In this example, air pump 73 is a readily available 12-volt JABSCO® air pump, Model No. 36740-0000, which is electrically connected to the vehicle 20 electrical system with wiring 88 in FIG. 6 so as to be powered by the standard 12 volt vehicle 20 electrical system.

In FIG. 6, outlet 90 is coupled in gaseous communication to inlet 71 of roll cage 50, and outlet 91 is coupled in gaseous communication to inlet 72 of roll cage 50. Outlet 90 of air pump 73 is coupled in gaseous communication to inlet 71 with a conduit 94, and outlet 91 of air pump 73 is coupled in gaseous communication to inlet 72 with a conduit 95. Conduit 94, which is a flexible conduit fashioned of rubber or flexible plastic, has an end 94A coupled to outlet 90 of air pump 73 in gaseous communication in FIGS. 6 and 7, and an end 94B coupled in gaseous communication to inlet 71 of roll cage 50 in FIG. 6. Conduit 95, which is also a flexible conduit fashioned of rubber or flexible plastic, has an end 95A coupled to outlet 91 of air pump 73 in gaseous communication in FIGS. 6 and 7, and an end 95B coupled in gaseous communication to inlet 72 of roll cage 50 in FIG. 6. End 94A of conduit 94 is fitted over outlet 90 of air pump 73 and is secured to outlet 90 with band clamp 96 in FIGS. 6 and 7. End 94B of conduit 94 is fitted over inlet 71 of roll cage 50 and is secured to inlet 71 with band clamp 97 in FIG. 6. End 95A of conduit 95 is fitted over outlet 91 of air pump 73 and is secured to outlet 91 with band clamp 98 in FIGS. 6 and 7. End 95B of conduit 95 is fitted over inlet 72 of roll cage 50 and is secured to inlet 72 with band clamp 99 in FIG. 6.

Figure 8:
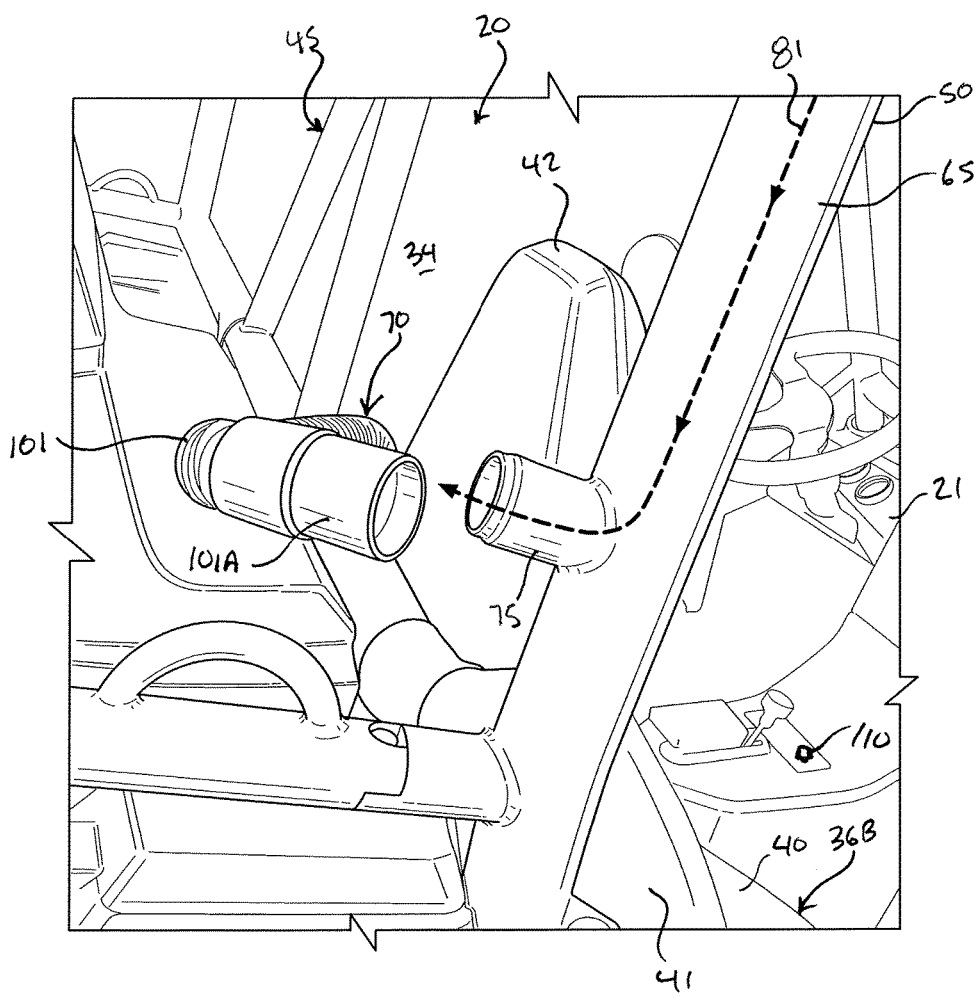
FIG. 8 is an enlarged perspective view corresponding to FIG. 1 illustrating a helmet conduit detached from an outlet of the roll over protection structure.

Referring to FIGS. 1-4 and 8 in relevant part, outlet 74 is coupled in gaseous communication to inlet 76A of helmet 76, and outlet 75 is coupled in gaseous communication to inlet 77A of helmet 77. Outlet 74 of roll cage 50 is coupled in gaseous communication to inlet 76A of helmet 766 with a conduit 100, and outlet 75 of roll cage 50 is coupled in gaseous communication to inlet 77A of helmet 77 with a conduit 101. Conduit 100, which is a flexible conduit fashioned of rubber or flexible plastic, has an end 100A coupled to outlet 74 of roll frame 50 in gaseous communication, and an end 100B coupled in gaseous communication to inlet 76A of helmet 76. Conduit 101, which is also a flexible conduit fashioned of rubber or flexible plastic, has an end 101A coupled to outlet 75 of roll cage 50 in gaseous communication, and an end 101B coupled in gaseous communication to inlet 77A of helmet 77. End 100A of conduit 100 is fitted over outlet 74 of roll cage 50 and is frictionally engaged tightly against outlet 74. End 100B of conduit 100 is fitted over inlet 76A of helmet 76 and frictionally engaged tightly against inlet 76A. End 101A of conduit 101 is fitted over outlet 75 of roll cage 50 and is frictionally engaged tightly against outlet 75. End 101B of conduit 101 is fitted over inlet 77A of helmet 77 and frictionally engaged tightly against inlet 77A. For illustrative purposes, FIG. 8 illustrates end 101A of conduit 101 as it would appear detached from outlet 75 in preparation for insertion over outlet 75.

Air pump 73 activates in response to starting vehicle 20. In an alternate embodiment, air pump 73 can be selectively turned OFF and ON with switch 110 in FIGS. 4, 6, and 8. Switch 110, electrically connected to air pump 73 with wiring 88, is mounted to console 111 in passenger compartment 34 between left and right seats 36A and 36B so as to be readily accessible by vehicle 20 occupants. Switch 110 can be mounted to the dash or to other locations in passenger compartment 34 so as to be readily accessible by vehicle 20 occupants. In response to activation of air pump 73, air pump 73 draws ambient air through air filter 73A, which removes solid particulates, such as dust, pollen, mold, and bacteria, from the air, and pumps the filtered air, suitable for breathing, through outlets 90 and 91 into conduits 94 and 94, which convey the filtered air into airflow pathways 80 and 81 through inlets 71 and 72 of roll frame 50. The filtered air passing into and through inlets 71 and 72 enter the hollow structural tubing of roll frame 50 and naturally flow into the respective airflow pathways 80 and 81. Air entering inlet 71 flows natural into and through airflow pathway 80 to outlet 74 coupled in gaseous communication to helmet 76 with conduit 100, and air entering inlet 72 flows through naturally through airflow pathway 81 to outlet 75 coupled in gaseous communication to helmet 77 with conduit 101. The filtered air flows through outlets 74 and 75 into conduits 100 and 101, which convey the filtered air into helmets 76 and 77 through inlets 76A and 76B for breathing by the respective wearers, which include drive D in FIGS. 1-3, the wearer of helmet 76, and passenger P in FIGS. 1-3, the wearer of helmet 77.

During the use of vehicle 20, system 70 provides breathable air to helmets 76 and 77 worn by driver D and passenger P, respectively, allowing for the comfortable operation of vehicle 20 when the ambient air conditions tend not to be favorable for comfortable breathing, such as in dusty conditions. Helmets 76 and 77 are independently wearable and independently usable with system 70. Accordingly, a lone drive operating vehicle 20 can wear helmet 76 to receive breathing air from system 70 when driving vehicle 20 alone, and a passenger of vehicle can wear helmet 77 to receive breathing air from system 70 regardless of whether the driver chooses to us system 70. With outlet 74 formed in left stay structural tube 64 adjacent to the outer side of left seat 36A near left side 32 of body 21 behind and near top 42 of seat back 41 of left seat 36A and extending rearwardly from left stay structural tube 64, conduit 100 gaseously coupling outlet 74 to helmet 76 can be wrapped around the back of seat back 41 of left seat 36A behind the driver D to assist in keeping conduit 100 from flapping around in passenger compartment 34 in front of the driver D seated in left seat 36A during vehicle 20 operation. Likewise, with outlet 75 formed in right stay structural tube 65 adjacent to the outer side of right seat 3BA near right side 33 of body 21 behind and near top 42 of seat back 41 of right seat 36B and extending rearwardly from right stay structural tube 65, conduit 101 gaseously coupling outlet 75 to helmet 77 can be wrapped around the back of seat back 41 of right seat 36B behind the passenger P to assist in keeping conduit 101 from flapping around in passenger compartment 34 in front of the passenger P seated in right seat 36B during vehicle 20 operation.

In system 70, inlet 71 is coupled in gaseous communication to air pump 73, the preferred air source of system 70, outlet 74 is coupled in gaseous communication to a wearable, helmet 76 in the preferred embodiment, and airflow pathway 80 through the structural tubing of roll over protection structure 45, roll cage 50 in the preferred embodiment, couples inlet 71 to outlet 74 in gaseous communication. In system 70, inlet 72 is coupled in gaseous communication to air pump 73, again the preferred air source of system 70, outlet 75 is coupled in gaseous communication to a wearable, helmet 77 in the preferred embodiment, and airflow pathway 81 through the structural tubing of roll over protection structure 45, again being roll cage 50 in the preferred embodiment, couples inlet 72 to outlet 75 in gaseous communication. In system, helmets 76 and 77 are the preferred wearables. In an alternate embodiment, each of the wearables can be a face mask or other form of wearable that when worn fits over the wearer's face so as to direct the air from system 70 to the user's nose and/or mouth for breathing. Helmets 76 and 77 are the preferred given the nature of vehicle 20 as an ATV, and given that it is customary for the drivers and passengers of such vehicles to wear helmets during use of the vehicle.

System 70 thus incorporates two air flow pathways 80 and 81 coupled in gaseous communication to air pump 73 and to two corresponding helmets 76 and 77, one coupled in gaseous communication to airflow pathway 80 for driver D and one coupled in gaseous communication to airflow pathway 81 for passenger P. In an alternate embodiment, system 70 can incorporate more than two air flow pathways through a roll protection structure coupled in gaseous communication to a corresponding number of helmets, such as for vehicles having more than two occupant seats. In another embodiment, system 70 can include one airflow pathway through a roll over protection structure coupled in gaseous communication to one helmet, two helmets, or three or more helmets, such as from one outlet or a plurality of outlets, such as in vehicles having more than two seats. In yet another embodiment, system 70 can include a plurality of airflow pathways through a roll protection structure each coupled in gaseous communication to one or more helmets depending on the number of occupants the vehicle can accommodate.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus, comprising: a roll over protection structure for an open passenger compartment of an all-terrain vehicle (ATV) including a seat for accommodating an occupant of the ATV, the roll over protection structure comprises a roll cage, the roll cage is an openwork of structural tubing built around the open passenger compartment for protecting the occupant of the open passenger compartment when the roll cage is connected to the ATV, other than the roll over protection structure the open passenger compartment is not enclosed, being open to the atmosphere, enabling ambient air from the atmosphere to rush through the open passenger compartment when the roll cage is connected to the ATV, the roll cage further includes an inlet, an outlet, and an airflow pathway through the structural tubing coupling the inlet to the outlet in gaseous communication, the inlet is coupled in gaseous communication to a filtered air pump, the outlet is coupled in gaseous communication to a helmet via a conduit, the filtered air pump is for drawing ambient air from the atmosphere, filtering solid particulates from the ambient air for producing filtered breathing air, and pumping the filtered breathing air through the airflow pathway through the structural tubing from the inlet to the outlet and from the outlet to the helmet, and the helmet is for delivering the filtered breathing air to the occupant when the occupant is in the open passenger compartment, is seated in the seat, and is wearing the helmet when the ambient air is not favorable for breathing.

2. The apparatus according to claim 1, wherein the inlet is coupled in gaseous communication to the filtered air pump via a conduit.

3. Apparatus, comprising:
an all-terrain vehicle (ATV), the ATV includes a body mounted with a chassis, the body includes an open passenger compartment and a seat in the open passenger compartment for accommodating an occupant of the ATV in a sitting position; and
a roll over protection structure, the roll over protection structure comprises a roll cage, the roll cage is an openwork of structural tubing built around the open passenger compartment for protecting the occupant of the ATV when the occupant is in the open passenger compartment and is seated in the seat, other than the roll over protection structure the open passenger compartment is not enclosed, being open to an atmosphere, enabling ambient air from the atmosphere to rush through the open passenger compartment, the roll cage further includes an inlet, an outlet, and an airflow pathway through the structural tubing coupling the inlet to the outlet in gaseous communication, the inlet is coupled in gaseous communication to a filtered air pump, the outlet is coupled in gaseous communication to a helmet via a conduit, the filtered air pump is for drawing ambient air from the atmosphere, filtering solid particulates from the ambient air for producing filtered breathing air, and pumping the filtered breathing air through the airflow pathway through the structural tubing from the inlet to the outlet and from the outlet to the helmet, and the helmet is for delivering the filtered breathing air to the occupant of the ATV when the occupant of the ATV is in the open passenger compartment, is seated in the seat, and is wearing the helmet when the ambient air is not favorable for breathing.

4. The apparatus according to claim 3, wherein the inlet is coupled in gaseous communication to the filtered air pump via a conduit.

5. The apparatus according to claim 3, wherein the seat includes an upright seat back having a top, and the outlet is located near the top of the upright seat back.

* * * * *